(12) United States Patent
Blasczyk

(10) Patent No.: US 9,377,149 B2
(45) Date of Patent: Jun. 28, 2016

(54) SYSTEMS AND APPARATUS FOR INHIBITING A COMPRESSED PIPE LINER FROM RETREATING INTO A HOST PIPE

(71) Applicant: SAK Construction, LLC, O'Fallon, MO (US)

(72) Inventor: James H. Blasczyk, Friendswood, TX (US)

(73) Assignee: SAK Construction, LLC, O'Fallon, MO (US)

( * ) Notice: Subject to any disclaimer, the term of this patent is extended or adjusted under 35 U.S.C. 154(b) by 0 days.

(21) Appl. No.: 14/206,041

(22) Filed: Mar. 12, 2014

(65) Prior Publication Data

US 2014/0314492 A1    Oct. 23, 2014

Related U.S. Application Data

(60) Provisional application No. 61/784,874, filed on Mar. 14, 2013.

(51) Int. Cl.
| | |
|---|---|
| *F16L 1/06* | (2006.01) |
| *F16L 55/165* | (2006.01) |
| *B29C 63/46* | (2006.01) |
| *B29C 63/34* | (2006.01) |

(52) U.S. Cl.
CPC ............ *F16L 55/1652* (2013.01); *B29C 63/34* (2013.01); *B29C 63/346* (2013.01); *B29C 63/46* (2013.01)

(58) Field of Classification Search
CPC ........................................................ F16L 1/06
See application file for complete search history.

(56) References Cited

U.S. PATENT DOCUMENTS

| | | | | |
|---|---|---|---|---|
| 1,921,642 | A | * 8/1933 | Stephenson | 285/331 |
| 3,686,747 | A | * 8/1972 | Bagnulo | 29/508 |
| 3,887,983 | A |   6/1975 | Province | |
| 3,959,424 | A |   5/1976 | Dawson et al. | |
| 4,028,037 | A |   6/1977 | Dawson | |
| 4,400,019 | A | * 8/1983 | Fruck | 285/55 |
| 4,718,701 | A |   1/1988 | Vigneron et al. | |
| 4,720,211 | A |   1/1988 | Streatfield et al. | |
| 4,776,370 | A |  10/1988 | Long, Jr. | |
| 4,777,984 | A |  10/1988 | Storah | |
| 4,838,477 | A | * 6/1989 | Roach et al. | 228/222 |
| 5,048,174 | A |   9/1991 | McGuire | |
| 5,167,056 | A |  12/1992 | McGuire | |
| 5,244,237 | A | * 9/1993 | Harvey | 285/55 |
| 5,403,533 | A | * 4/1995 | Meier | 264/249 |

(Continued)

FOREIGN PATENT DOCUMENTS

| | | | |
|---|---|---|---|
| JP | 60141329 | A | 7/1985 |
| JP | 63115611 | A | 5/1988 |

(Continued)

OTHER PUBLICATIONS

International Search Report, International Patent Application No. PCT/US2014/028015, issued on Jul. 18, 2014, 14 pages.

(Continued)

*Primary Examiner* — Tara M. Pinnock
(74) *Attorney, Agent, or Firm* — Lewis Rice LLC

(57) ABSTRACT

A lock block for attaching to a diameter-reduced pipe liner pulled through a host pipe which braces the pipe liner and inhibits it from fully retreating into the host pipe when longitudinal tension is reduced and the pipe liner experiences length reduction.

9 Claims, 3 Drawing Sheets

(56) References Cited

U.S. PATENT DOCUMENTS

| | | | |
|---|---|---|---|
| 5,522,678 A | 6/1996 | Marshall et al. | |
| 5,580,589 A | 12/1996 | Stoves et al. | |
| 5,785,458 A * | 7/1998 | Handford | 405/184 |
| 5,944,058 A * | 8/1999 | Kamiyama et al. | 138/98 |
| 5,992,467 A | 11/1999 | Roach | |
| RE36,859 E | 9/2000 | Storah | |
| 6,152,184 A * | 11/2000 | Kamiyama et al. | 138/98 |
| 6,484,757 B1 * | 11/2002 | Warren | 138/98 |
| 6,539,978 B1 | 4/2003 | McGuire | |
| 6,979,025 B2 | 12/2005 | Conder et al. | |
| 7,793,992 B2 * | 9/2010 | Pionnetti | 285/288.1 |
| 7,861,743 B1 | 1/2011 | Wren | |
| 2007/0012373 A1 | 1/2007 | Driver | |

FOREIGN PATENT DOCUMENTS

| | | |
|---|---|---|
| JP | 0814477 A | 1/1996 |
| JP | 200210712 A | 8/2000 |
| WO | 90/02904 A1 | 3/1990 |
| WO | 01/16520 A1 | 3/2001 |

OTHER PUBLICATIONS

International Search Report, International Patent Application No. PCT/US2014/027685, issued on Jun. 26, 2014, 11 pages.
International Search Report, International Patent Application No. PCT/US2014/024221, issued on Jun. 27, 2014, 12 pages.
International Search Report, International Patent Application No. PCT/US2014/024490, issued on Jul. 24, 2014, 10 pages.

* cited by examiner

SYSTEMS AND APPARATUS FOR INHIBITING A COMPRESSED PIPE LINER FROM RETREATING INTO A HOST PIPE

CROSS REFERENCE TO RELATED APPLICATION(S)

This application claims benefit of U.S. Provisional Patent Application No. 61/784,874 filed Mar. 14, 2013, the entire disclosure of which is incorporated herein by reference.

BACKGROUND

1. Field of the Invention

This disclosure is related to the field of pipe reduction systems, specifically to pipe reduction systems which use a rigid die to compress a plastic pipe liner for insertion into another pipe via a pulling force exerted by a towing head.

2. Description of the Related Art

Over time, the underground pipelines utilized for the transport of fluids or gases or other elements can become damaged, worn or corroded from use. In the past, the methodologies utilized for rehabilitating these underground or underwater pipelines were costly, labor intensive, and severely disruptive to the surrounding environment and communities.

Today, one of the primary methods and systems utilized in the prior art for rehabilitating existing pipeline systems and networks and to avert these problems is to line an existing pipeline with an extremely tight fitting polyethylene (PE) liner. In such a process, the liner has an outside diameter that is slightly larger than the inside diameter of the pipe being lined, sometimes called a host pipe. Because of the difference in diameter between the liner and the host pipe, the liner is pulled through a die to reduce its diameter before it enters the host pipe.

Generally, the liner is pulled through the die after sections of the liner are butt fused together to form a continuous string. The die temporarily reduces the diameter of the liner. This reduction allows the liner to be easily pulled through the outer existing pipe system. The die used in the prior art systems generally has an entry, a throat and an exit, with the entry decreasing in diameter towards the throat and increasing in diameter away from the throat. Thus, the liner has a maximum diameter before the die, a minimum diameter in the die, and an intermediate diameter after the die. In some embodiments, a heating element is used to apply heat to the liner prior to liner being reduced in the die, the heating element being used to facilitate the reduction of the liner. This is, however, generally less preferred.

The tension given to the liner by the die is generally maintained by a pulling element until the liner is correctly located within the installed pipeline. Commonly, the liner is pulled through the die and the existing pipe system by a winch or towing head. Generally, the force of pulling rendered by the winch or towing head is half the yield strength of the liner or less. It is not uncommon for the forces exerted on the die and winch or pulling head to be very large, often exceeding 100 tons.

Since the liner retains a memory of its original shape and size, it will begin to return to its original shape and diameter when the pulling force is disconnected. After the pulling force is disconnected, the liner relaxes and presses tightly against the inside of the existing pipeline to which it was applied, eliminating any annular space. FIG. 1 depicts the portion of the prior art process in which a new liner (101) is pulled through a reducing die (103) (thereby reducing its diameter) and into the existing pipeline (105) (at its reduced diameter) by a towing head (107) or winch.

Although the prior art process held numerous benefits for the industry, including reducing disruption, creating a strong new pipe, jointless construction, improved flow, and cost savings, the process also has numerous deficiencies in terms of costs, safety and efficiency.

For example, due to the large force vectors exerted, in the prior art system massive ground anchors have to be utilized for both the die and the pulling head in order to withstand these forces. These anchoring systems can be cumbersome, costly, not readily transportable and inefficient.

Another problem with the currently utilized methodology arises from the use of a single reducing die mechanism. Fully reducing the die in a single step often results in extreme point friction on the liner in addition to strain on the liner and joints. This strain and friction often results in mechanical failure of the liner both pre- and post-insertion.

Further, the current systems are generally performed at the level of the pipe. Stated differently, chambers at the level of the pipe (below ground or water) are excavated at each end of the existing pipeline that will be lined. The die of the system is placed within the excavated chamber at the front of the existing pipeline that will be lined. These chambers are costly and time intensive to build. In addition, the excavation involved in creating these chambers can be disruptive to both the environment and the community. Further, because the die is placed within the chamber in these systems, there is often not much space between the reducing die and the existing pipeline, as demonstrated in prior art FIG. 1.

This is problematic for a number of reasons. Mainly, when the tension in the system is released, the inserted liner, in returning to its original diameter, shortens in length. With the die located in such close proximity to the existing pipeline, the end of the liner often gets unintentionally sucked into the existing pipeline, resulting in an incomplete lining situation. This post-release creep can present other problems. After the tension in the system is released, it is not uncommon for the inserted liner to creep or shrink more than expected. Generally, this gradual creep continues for a significant period of time after the insertion and release of the liner. This continued moving and pulling of the inserted liner is problematic because it results in a misformed liner that is susceptible to potential leaks and can pull the liner out of attached fittings.

While longitudinal reversion is expected after tension is released, it is suspected that the liner continues to undergo reversion or creeping for an indefinite period of time, including after the project is completed and the liner is no longer monitored. When a project is completed, however, any surplus liner extending beyond the host pipe is generally trimmed. If the liner continues to revert or creep, the cut end of the liner is at risk of retreating into the host pipe, defeating the purpose of threading a pipe liner in the first place, and rendering it very difficult and expensive to retrieve or augment the liner with additional lengths of liner. Further, fittings are often attached to the end of the liner. If the liner retreats into the host pipe before these fittings are installed, it may become impossible to maintain them. Even if the fittings are installed before such retreat, as the liner continues to creep, these fittings may be exposed to excessive forces jeopardizing the integrity of the joint.

A reduced diameter liner experiences high levels of longitudinal tension resulting in longitudinal stretching. It has been observed that even a relatively short length of pipe may stretch by five to ten feet when exposed to the tensions involved in pipe reduction systems. When the liner is in place and the tension is released, the liner will begin to revert to its shape and size prior to the reduction. Over the course of about a 24 hour period, it has been observed that a liner generally reverts about 80-90% to its initial size and shape, and this reverting process includes length reduction.

SUMMARY

Described herein, among other things, is a lock block comprising a bottom generally in the configuration of a rectangular prism and configured for rigidly attaching to a pipe liner, the bottom having a proximal end; a top generally in the configuration of a rectangular prism having generally the same size and shape as the bottom, the top having a proximal end; a brace generally perpendicularly attached to the bottom and the top and extending therebetween, the brace attached to the top and the bottom in corresponding locations on the top and the bottom such that the proximal end of the top is generally coplanar with the proximal end of the bottom; wherein the top, the bottom, and the brace define a cavity of a generally C-shape structure such that when the bottom is attached to a portion of a longitudinally lengthened pipe liner reverting to its natural length, the pipe liner is inhibited from retreating into the host pipe by an edge of the host pipe contacting the brace between the top and the bottom.

In an embodiment of the lock block, the bottom is configured for rigidly attaching to a pipe liner comprising polyethylene.

In a further embodiment of the lock block, the bottom is configured for rigidly attaching to a pipe liner comprising polyethylene by plastic welding.

In a still further embodiment of the lock block, the lock block further comprises circuitry which, when activated, plastic welds the bottom to the pipe liner.

In a still further embodiment of the lock block, the lock block further comprising a remote activation switch configured to activate the circuitry when the remote activation switch is activated.

In a yet further embodiment of the lock block, the remote activation switch is connected to the circuitry by a wire.

In an alternative further embodiment of the lock block, the remote activation switch is configured to activate the circuitry wirelessly.

In a further embodiment of the lock block, the bottom further comprises an exterior side having an adhesive coating.

In a still further embodiment of the lock block, the longitudinal lengthening force is tension from a towing head pulling the pipe liner through a diameter-reducing die.

Also described herein, among other things, is a method for inhibiting a pipe liner from retreating into a host pipe comprising: providing a host pipe having a rim; providing a longitudinally lengthened pipe liner experiencing a longitudinal lengthening force, the pipe liner threaded through the host pipe and extending longitudinally beyond the rim such that an exposed portion of the pipe liner is not circumscribed by the host pipe; providing a lock block having a generally C-shaped portion comprising: a top comprising a proximal end; a bottom comprising a proximal end generally coplanar with the proximal end of the top; a brace extending between the top and the bottom and generally perpendicularly attached to the top and the bottom; wherein the top, the bottom, and the brace define the cavity of the C-shape; welding the bottom to the exposed portion; reducing the longitudinal lengthening force; the pipe liner reducing length in response to the reduced longitudinal lengthening force; the proximal end of the bottom attached to the exposed portion entering the host pipe while the pipe liner reduces length; the rim entering the cavity and contacting the brace after the proximal end of the bottom enters the host pipe; the contact between the rim and the brace bracing the lock block and inhibiting the pipe liner from fully retreating into the host pipe.

In an embodiment of the method, the pipe liner comprises polyethylene.

In an alternative embodiment of the method, the longitudinal lengthening force is tension from a towing head pulling the pipe liner through a diameter-reducing die.

In another embodiment of the method, when the proximal end of the attached bottom enters the host pipe, the proximal end of the top passes over the rim.

In a further embodiment of the method, the method further comprises: providing a plurality of a lock blocks; welding each one of the plurality of lock blocks to the exposed portion; at least a portion of the rim entering each one of the cavities of the plurality of lock blocks and contacting each one of the braces of the plurality of lock blocks after the length reduction causes each one of the proximal ends of the bottoms of the plurality of lock blocks attached to the exposed portion to enter the host pipe; the contact of the rim with each one of the braces of the plurality of lock blocks bracing each one of the plurality of lock block and inhibiting the pipe liner from retreating further into the host pipe.

DESCRIPTION OF THE PREFERRED EMBODIMENT(S)

The following detailed description and disclosure illustrates by way of example and not by way of limitation. This description will clearly enable one skilled in the art to make and use the disclosed systems and apparatus, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

Described herein are systems and devices for inhibiting a tension-fit pipe liner installed in a host pipe from retreating into the host pipe. The apparatus described is known as a "lock block." The lock block generally is attached to a diameter-reduced liner before the liner fully reverts to its natural shape and size. The lock block is generally sized and shaped so that if the lock block is attached to an installed liner before the installed liner fully retreats into the host pipe, the lock block inhibits the liner from fully retreating into the host pipe. For example, as the liner returns to its natural shape and experiences longitudinal shortening, according to one embodiment the lock block catches on the lip or edge of the host pipe, inhibiting or in some cases entirely preventing the liner from retreating further into the host pipe.

Figure 1:
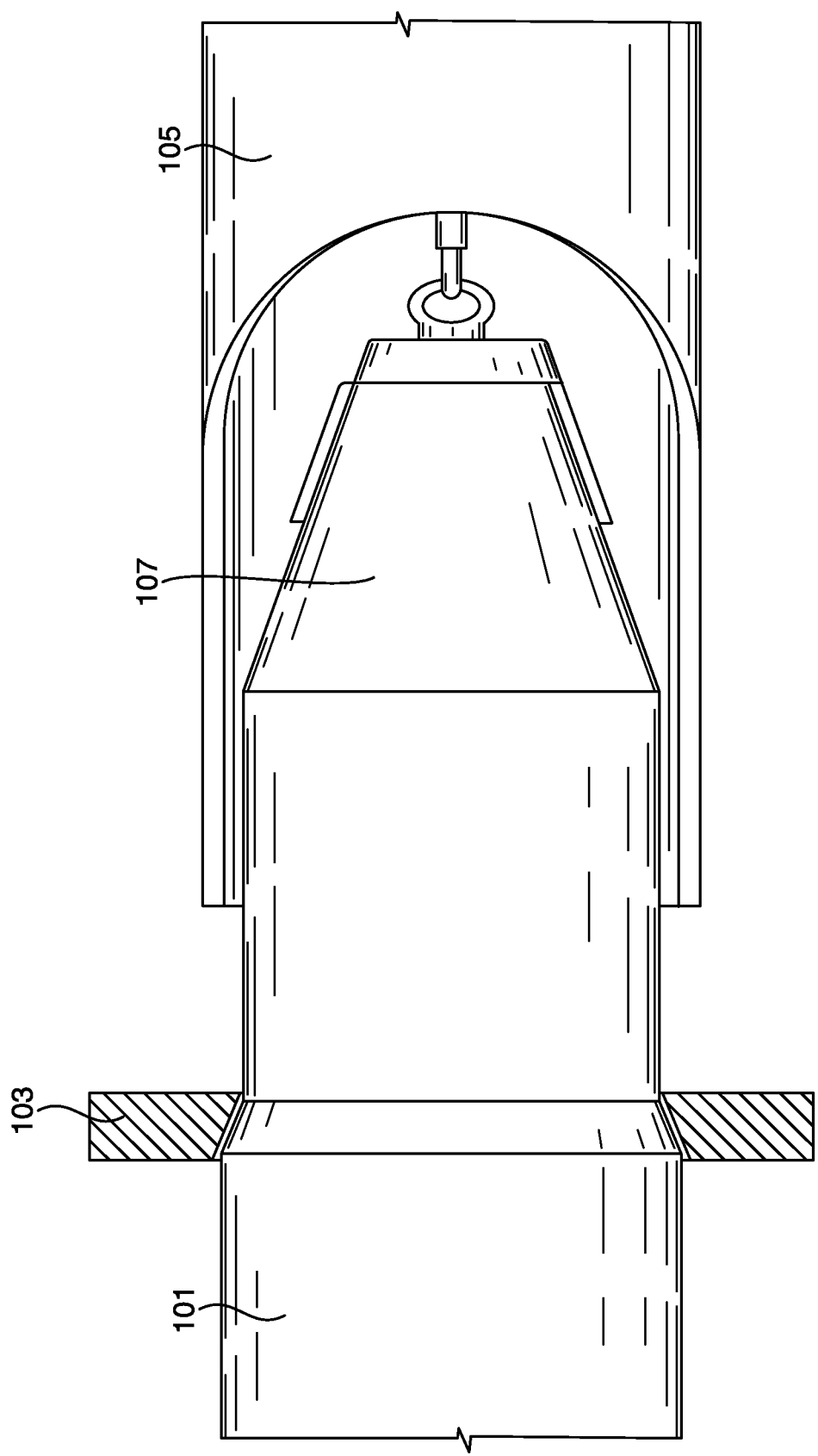
FIG. 1 depicts an embodiment of a prior art process.
Figure 2:
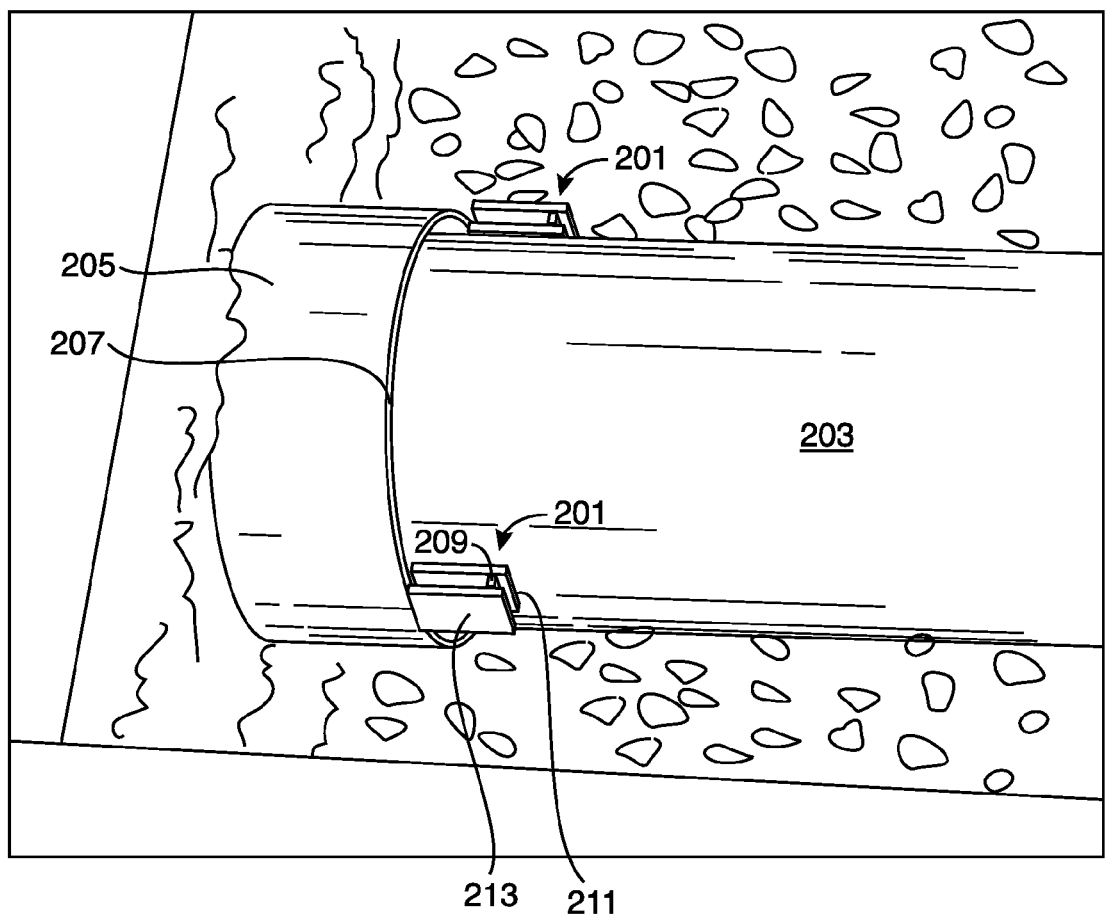
FIG. 2 depicts an embodiment of systems and apparatus for reducing compressed pipe retreating into a host pipe.
Figure 3:
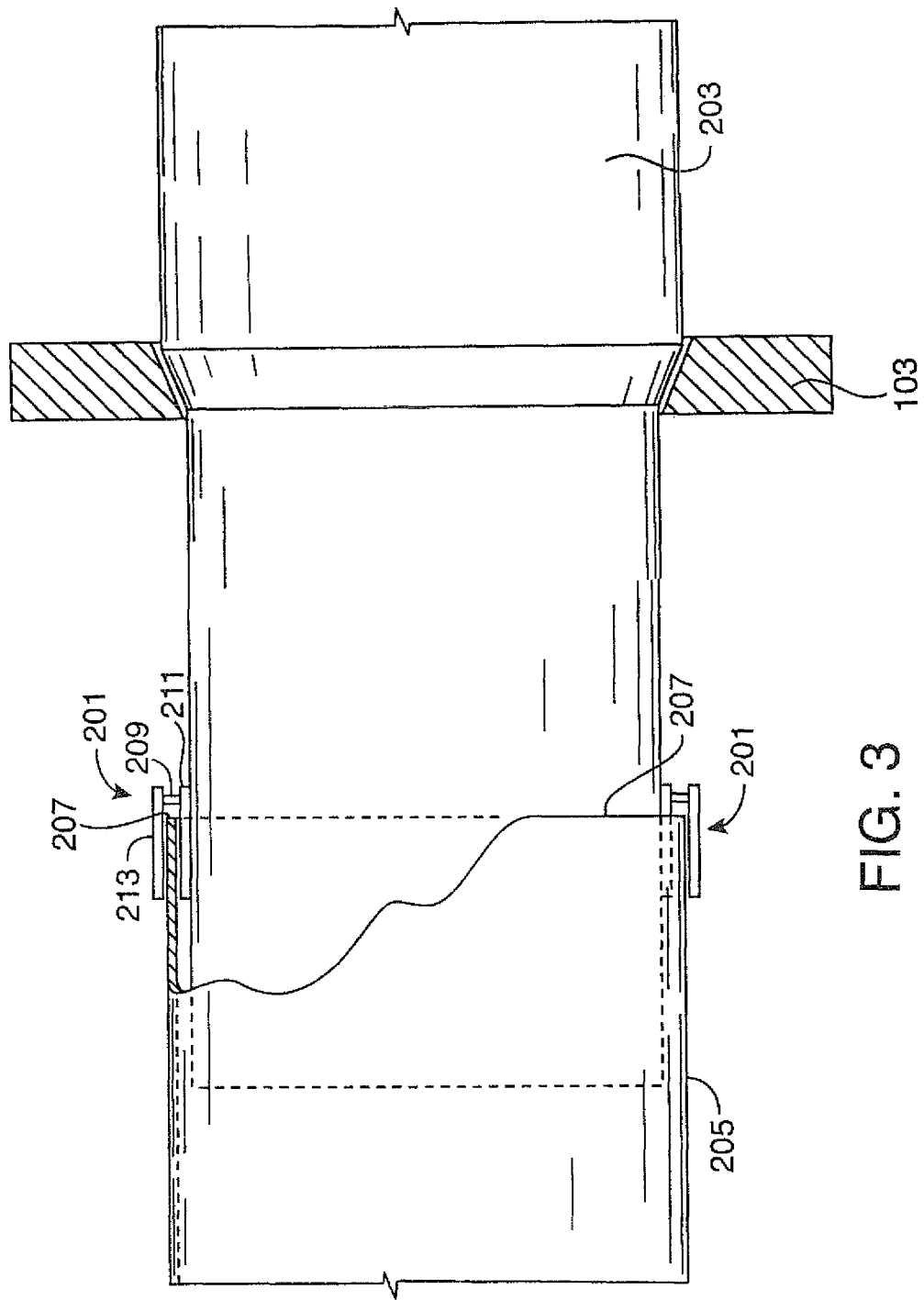
FIG. 3 depicts a cross-sectional view of an embodiment of a lock block engaging with a host pipe while attached to a diameter-reduced liner in the host pipe.

The lock block is generally attached to the exterior of the liner after the liner has been installed in a host pipe. According to another embodiment, the lock block is attached to a portion of the installed liner protruding from the host pipe or otherwise not enclosed, encompassed, or circumscribed by the host pipe. FIGS. 2 and 3 depict one such embodiment. In the depicted embodiment of FIGS. 2 and 3, lock block (201) is disposed upon a diameter-reduced pipe liner (203) which has been threaded through host pipe (205). The depicted lock block (201) generally comprises a bottom (211), which is attachable to liner (203) and connected by brace (209) to a top (213).

Top (213) and bottom (211) are generally in the configuration of elongated rectangular prisms. According to an embodiment, top (213) and bottom (211) are approximately the same size and shape, but in an alternative embodiment, top (213) and bottom (211) may have different sizes or shapes. In an embodiment, top (213) and bottom (211) are arranged in parallel with each other, and bracing element (209) is attached to top (211) and bottom (213) generally perpendicularly, extending therebetween.

According to an embodiment, bottom (211) is rigidly attached to a portion of the exterior surface of liner (203) outside host pipe (205) through any means now known or later developed in the art, including, but not limited to, plastic welding or fusing, and further including, but not limited to, by use of an electronic apparatus sending an electric current through lock block (201) causing lock block (201) to weld or fuse to liner (203). In such an embodiment, lock block (201) generally comprises circuitry which causes such welding or fusing. By way of example and not limitation, the circuitry may be activated remotely using a wired controller or contact, or wirelessly using any wireless protocol or transmission technique now known or in the future developed in the art.

Generally, the joinery between liner (203) and bottom (211) is capable of withstanding several tons of pressure. This is because the weld holds lock block (201) to liner (203) and, if the lock block (201) is to prevent liner (203) from retreating, much of the longitudinal force of liner (203) reverting or attempting to revert to its natural length and diameter will be transferred to lock block (201). If the weld fails, liner (203) may continue to retreat into host pipe (205).

According to an embodiment, brace (209) is rigidly attached to bottom (211) and top (213) and is generally perpendicularly attached thereto. Brace (209) is preferably made from a strong, rigid material capable of withstanding a large amount of tension or pressure, preferably several tons as described elsewhere herein. When bottom (211) is attached to liner (203) and liner (203) experiences longitudinal contraction, the portion of liner (203) to which bottom (211) is attached will tend to retreat toward host pipe (205). As liner (203) continues to retreat into host pipe (205), brace (209) will contact the outer rim or lip (207) of host pipe (205). Brace (209) then inhibits or prevents further retreat of liner pipe (203) into host pipe (205) because bracing element (209) is braced against rim (207) and welded to liner (203).

When lock block (201) is attached to liner (203), top (213) and bottom (211) have a proximal end nearest host pipe (205), and a distal end opposite the proximal end. Brace (209) is generally attached to top (213) and bottom (211) such that brace (209) is not flush with the proximal end of lock block (201). This structure forms a generally C-shaped cavity when the lock block (201) is viewed from a side elevation, where the cavity of the C is open towards the edge (207) of host pipe (205). When lock block (201) is attached to the exterior of liner (203) outside of host pipe (205), as liner (203) retreats into host pipe (205), lock block (201) moves towards host pipe (205) and portions of bottom (211) and top (213) move past rim (207) on either side, with bottom (211) moving past rim (207) interiorly (i.e., bottom (211) is between the exterior of liner (203) and interior of host pipe (205)) and top (213) moving past rim (207) exteriorly (i.e., exterior to both host pipe (205) and liner (203)). The edge (207) of host pipe (205) can become trapped in the C-shaped cavity such that a portion of top (213) extends above the exterior of host pipe (205) and bottom (211) extends below the interior of host pipe (205), and brace (209) impacts edge (207), inhibiting further longitudinal contraction. Top (213) and bottom (211) thus have portions further towards the longitudinal center of host pipe (205) than brace (209). Also, top (213) and bottom (211) of the locking block (201), by extending further towards the longitudinal center of host pipe (205), inhibit slippage or shearing of lock block (201) by trapping edge (207) against brace (209). This allows brace (209) to flex, bow, bend, or otherwise not be aligned perpendicularly to edge (207) while still inhibiting further contraction of liner (203).

In an alternative embodiment, bottom (211) and/or top (213) can be used to provide longitudinal bracing similar to bracing element (209). In such an embodiment, as liner (203) retreats into host pipe (205), the gap between the interior surface of host pipe (205) and the exterior surface of liner (203) is less than the elevation of bottom (211) over the exterior surface of liner (203). In such an embodiment, the proximal end of bottom (211) to rim (207) generally braces lock block (201) against rim (207) and reduces or prevents liner (203) from retreating into host pipe (205).

In an embodiment, a plurality of lock blocks (201) are used in conjunction with a liner (203) to reduce or prevent said liner (203) from retreating into host pipe (205). The number of lock blocks (201) used in an embodiment may vary depending upon, among other things, the amount of force, pressure, or tension the lock blocks (201) are configured or tested to resist, the diameter of the host pipe (205) and/or the diameter of the liner (203). However, there will generally be between 2 and 5 blocks (201) present in most installations.

In an embodiment, liner (203) is threaded through host pipe (205) and one or more lock blocks (201) are rigidly attached to a portion of the exterior surface of liner (203) extending from and not circumscribed or enclosed by host pipe (205), which portion of liner (203) then retreats toward host pipe (205) until lock block (201) braces against rim (207), including but not limited to bracing element (209) bracing against rim (207).

While this invention has been disclosed in connection with certain preferred embodiments, this should not be taken as a limitation to all of the provided details. Modifications and variations of the described embodiments may be made without departing from the spirit and scope of this invention, and other embodiments should be understood to be encompassed in the present disclosure as would be understood by those of ordinary skill in the art.

The invention claimed is:

1. A method for inhibiting a pipe liner from retreating into a host pipe comprising:
   providing a host pipe having a rim;
   providing a longitudinally lengthened pipe liner experiencing a longitudinal lengthening force from tension from a towing head pulling said pipe liner through a diameter-reducing die, said pipe liner threaded through said host pipe and extending longitudinally beyond said rim such that an exposed portion of said pipe liner is not circumscribed by said host pipe;
   providing a lock block having a generally C-shaped portion comprising:
   a top comprising a proximal end;
   a bottom comprising a proximal end generally coplanar with said proximal end of said top;
   a brace extending between said top and said bottom and generally perpendicularly attached to said top and said bottom;

wherein said top, said bottom, and said brace define the cavity of said C-shape;
welding said bottom to said pipe liner exposed portion;
reducing said longitudinal lengthening force;
said pipe liner reducing in length in response to said reduced longitudinal lengthening force;
said proximal end of said bottom attached to said pipe liner exposed portion entering said host pipe while said pipe liner reduces in length;
said rim entering said cavity and contacting said brace after said proximal end of said bottom enters said host pipe;
said contact between said rim and said brace bracing said lock block and inhibiting said pipe liner from fully retreating into said host pipe.

2. The method according to claim 1, wherein said pipe liner comprises polyethylene.

3. The method according to claim 1, wherein when said proximal end of said attached bottom enters said host pipe, said proximal end of said top passes over said rim.

4. The method according to claim 1, wherein said method further comprises:
providing a plurality of a lock blocks;
welding each one of said plurality of lock blocks to said exposed portion;
at least a portion of said rim entering each one of said cavities of said plurality of lock blocks and contacting each one of said braces of said plurality of lock blocks after said length reduction causes each one of said proximal ends of said bottoms of said plurality of lock blocks attached to said exposed portion to enter said host pipe; and
said contact of said rim with each one of said braces of said plurality of lock blocks bracing each one of said plurality of lock block and inhibiting said pipe liner from retreating further into said host pipe.

5. The method according to claim 1, wherein said lock block further comprises circuitry which, when activated, welds said bottom to said pipe liner exposed portion.

6. The method according to claim 5, wherein said lock block further comprises a remote activation switch configured to activate said circuitry when said remote activation switch is activated.

7. The method according to claim 6, wherein said remote activation switch is connected to said circuitry by a wire.

8. The method according to claim 6, wherein said remote activation switch is configured to activate said circuitry wirelessly.

9. The method according to claim 1, wherein said bottom further comprises an exterior side having an adhesive coating.

* * * * *